US008721894B2

(12) United States Patent
Drake

(10) Patent No.: US 8,721,894 B2
(45) Date of Patent: May 13, 2014

(54) METHODS FOR HYDRODYNAMIC CONTROL OF A CONTINUOUS WATER PURIFICATION SYSTEM

(75) Inventor: Ronald N. Drake, Helena, MT (US)

(73) Assignee: Drake Water Technologies, Inc., Helena, MT (US)

(*) Notice: Subject to any disclaimer, the term of this patent is extended or adjusted under 35 U.S.C. 154(b) by 330 days.

(21) Appl. No.: 12/983,296

(22) Filed: Jan. 1, 2011

(65) Prior Publication Data
US 2011/0163038 A1 Jul. 7, 2011

Related U.S. Application Data

(63) Continuation-in-part of application No. 11/052,409, filed on Feb. 7, 2005, now Pat. No. 7,862,715.

(51) Int. Cl.
C02F 1/42 (2006.01)

(52) U.S. Cl.
USPC ............ 210/661; 210/676; 210/678; 210/681

(58) Field of Classification Search
USPC .......... 210/661, 676, 681, 660, 662, 675, 678
See application file for complete search history.

(56) References Cited

U.S. PATENT DOCUMENTS

| | | | |
|---|---|---|---|
| 1,604,649 A | 10/1926 | Manning | |
| 1,608,661 A | 11/1926 | Nordell | |
| 1,707,302 A | 4/1929 | Godsey | |
| 1,740,199 A | 12/1929 | Nordell | |
| 2,222,828 A | 11/1940 | Guthrie | |
| 2,273,557 A | 2/1942 | Bonotto | |
| 2,556,480 A | 6/1951 | Miller | |
| 2,585,491 A | 2/1952 | Olsen | |
| 2,585,492 A | 2/1952 | Olsen | |
| 2,614,133 A | 10/1952 | Ockert | |
| 2,631,727 A | 3/1953 | Cichelli | |
| 2,666,500 A | 1/1954 | Cahn et al. | |
| 2,671,714 A | 3/1954 | McIlhenney et al. | |
| 2,673,176 A | 3/1954 | Whitney | |
| 2,679,539 A | 5/1954 | McKay | |
| 2,696,304 A | 10/1954 | Gilmore | |
| 2,696,305 A | 12/1954 | Slover | |
| 2,731,149 A | 1/1956 | Findlay | |

(Continued)

OTHER PUBLICATIONS

Savage, Matthew O., "Advisory Action before the Filing of an Appeal Brief re U.S. Appl. No. 11/052,409", Dec. 16, 2009, p. 4, Published in: US.

(Continued)

Primary Examiner — Matthew O Savage
(74) Attorney, Agent, or Firm — Neugeboren O'Dowd PC

(57) ABSTRACT

Methods and apparatus for removing contaminants from liquid using a continuously circulating stream of purifying media are disclosed. In one embodiment the method includes mixing a regenerated purifying media with a contaminated liquid containing diverse contaminants; co-currently transporting the purifying media and the contaminated liquid in a mixed state; removing, using the purifying media, while co-currently transporting the purifying media and the contaminated liquid, contaminants from the contaminated liquid so as to produce a mixture of a decontaminated liquid and a contaminated purifying media; and separating contaminated purifying media from the decontaminated liquid. In addition, the contaminated purifying media is contacted in counter current fashion with a regenerant solution so as to produce a regenerated purifying media and the regenerated purifying media is returned to the mixing step, whereby the continuously circulating purifying media selectively removes contaminants from the liquid.

18 Claims, 7 Drawing Sheets

(56) References Cited

U.S. PATENT DOCUMENTS

| | | | |
|---|---|---|---|
| 2,744,840 A | 5/1956 | Daniels et al. | |
| 2,767,140 A | 10/1956 | Fitch | |
| 2,773,028 A | 12/1956 | Monet | |
| 2,815,322 A | 12/1957 | Higgins | |
| 2,852,464 A | 9/1958 | Nordell | |
| 2,863,829 A | 12/1958 | Henke et al. | |
| 2,866,827 A | 12/1958 | Jurgeleit et al. | |
| 2,881,127 A | 4/1959 | Hetzel | |
| 2,951,036 A | 8/1960 | Bodkin et al. | |
| 2,959,542 A | 11/1960 | Pye et al. | |
| 2,963,431 A | 12/1960 | Dorn et al. | |
| 2,985,589 A | 5/1961 | Broughton et al. | |
| 3,002,922 A | 10/1961 | Baddour | |
| 3,019,079 A | 1/1962 | Donohue | |
| 3,084,120 A | 4/1963 | Cecil et al. | |
| 3,152,072 A | 10/1964 | Yomiyama et al. | |
| 3,193,498 A | 7/1965 | Platzer et al. | |
| 3,200,067 A | 8/1965 | Levendusky | |
| 3,201,491 A | 8/1965 | Stine et al. | |
| 3,207,577 A | 9/1965 | Mizuma | |
| 3,215,624 A | 11/1965 | Frazer et al. | |
| 3,231,492 A | 1/1966 | Stine et al. | |
| 3,268,605 A | 8/1966 | Boyd, Jr. | |
| 3,298,950 A | 1/1967 | Mindler | |
| 3,311,552 A | 3/1967 | Staats | |
| 3,378,339 A | 4/1968 | Yamashiki | |
| 3,403,097 A | 9/1968 | Yamashiki et al. | |
| 3,607,740 A * | 9/1971 | Akeroyd | 210/676 |
| 3,679,581 A | 7/1972 | Kunz | |
| 3,956,115 A | 5/1976 | Arion | |
| 3,993,562 A | 11/1976 | Kashiwabara et al. | |
| 4,035,292 A | 7/1977 | Himsley | |
| 4,070,281 A | 1/1978 | Tagashira et al. | |
| 4,085,042 A | 4/1978 | Misumi et al. | |
| 4,087,357 A | 5/1978 | Barrett et al. | |
| 4,088,563 A | 5/1978 | Marquardt | |
| 4,181,605 A | 1/1980 | Braswell | |
| 4,202,737 A | 5/1980 | Shimizu | |
| 4,228,001 A | 10/1980 | Carlson | |
| 4,229,292 A | 10/1980 | Mori et al. | |
| 4,246,355 A | 1/1981 | Bolto et al. | |
| 4,279,755 A | 7/1981 | Himsley | |
| 4,412,866 A | 11/1983 | Schoenrock et al. | |
| 4,412,923 A | 11/1983 | Capitani et al. | |
| 4,427,639 A | 1/1984 | Himsley | |
| 4,448,693 A | 5/1984 | Kiehling et al. | |
| RE31,687 E | 9/1984 | Himsley | |
| 4,563,337 A | 1/1986 | Kim | |
| 4,604,209 A | 8/1986 | Himsley | |
| 4,645,595 A | 2/1987 | Kim et al. | |
| 4,652,352 A | 3/1987 | Saieva | |
| 4,661,258 A | 4/1987 | Phillips | |
| 4,693,818 A | 9/1987 | Terrien et al. | |
| 4,740,310 A | 4/1988 | Dickey | |
| 4,775,484 A | 10/1988 | Schmidt et al. | |
| 4,808,317 A | 2/1989 | Berry et al. | |
| 4,842,744 A | 6/1989 | Schade | |
| 4,864,012 A | 9/1989 | Britt | |
| 4,906,361 A | 3/1990 | Arnaud | |
| 4,923,615 A | 5/1990 | Mehmet | |
| 4,923,616 A | 5/1990 | Hirata | |
| 5,066,371 A | 11/1991 | DeVoe et al. | |
| 5,124,043 A | 6/1992 | Arnaud | |
| 5,126,056 A | 6/1992 | Carlson | |
| 5,156,736 A | 10/1992 | Schoenrock | |
| 5,232,953 A | 8/1993 | Johnson | |
| 5,531,902 A | 7/1996 | Gallup | |
| 5,534,153 A | 7/1996 | Scott et al. | |
| 5,547,551 A | 8/1996 | Bahar et al. | |
| 5,580,445 A | 12/1996 | Iwatsuka et al. | |
| 5,580,461 A | 12/1996 | Cairns et al. | |
| 5,614,100 A | 3/1997 | Gallup | |
| 5,707,514 A | 1/1998 | Yamasaki et al. | |
| 5,736,052 A | 4/1998 | Concklin | |
| 5,772,891 A | 6/1998 | Yamasaki et al. | |
| 6,059,974 A | 5/2000 | Scheurman, III | |
| 6,228,257 B1 | 5/2001 | Arnaud | |
| 6,334,956 B1 | 1/2002 | Hanemaaijer | |
| 6,340,427 B1 | 1/2002 | Fukui et al. | |
| 6,375,851 B1 | 4/2002 | Sterling et al. | |
| 6,563,010 B1 | 5/2003 | Liepa | |
| 6,576,137 B1 | 6/2003 | Ma | |
| 6,716,344 B1 | 4/2004 | Bassi et al. | |
| 7,368,059 B2 | 5/2008 | Drake | |
| 7,862,715 B2 | 1/2011 | Drake | |

OTHER PUBLICATIONS

O'Dowd, Sean R., "Appeal Brief Under 37 CFR 41.37 re U.S. Appl. No. 11/052,409", May 7, 2010, p. 37, Published in: US.

O'Dowd, Sean R., "Grounds of Rejection to be Reviewed on Appeal for the Appeal Brief Previously Submitted on May 7, 2010 Under 37 CFR 41.37", Jun. 19, 2010, p. 5, Published in: US.

Philar, Ravi, "Office Action in re Canadian Patent Application 2,555,292", Mar. 22, 2012, p. 2, Published in: CA.

Philar, Ravi, "Office Action re Canadian Patent Application 2,555,292", May 16, 2011, p. 3, Published in: CA.

Dekleine, Geoffrey, "Response to Office Action in re Canadian Patent Application 2,555,292", Mar. 22, 2012, p. 2, Published in: CA.

Dekleine, Geoffrey, "Response to Office Action in re Canadian Patent Application 2,555,292", Nov. 16, 2011, p. 7, Published in: CA.

Lowe, Delores, "Notification of Non-Compliant Appeal Brief", May 21, 2010, p. 4, Published in: US.

Savage, Matthew O., "Office Action in re U.S. Appl. No. 11/052,409", Mar. 11, 2009, p. 10, Published in: US.

Savage, Matthew O., "Office Action in re U.S. Appl. No. 11/052,409", Jul. 16, 2008, p. 13, Published in: US.

Savage, Matthew O., "Office Action in re U.S. Appl. No. 11/052,409", Sep. 28, 2007, p. 7, Published in: US.

Savage, Matthew O., "Final Office Action in re U.S. Appl. No. 11/052,409", Oct. 7, 2009, p. 12, Published in: US.

O'Dowd, Sean R., "Pre-Appeal Brief Request for Review re U.S. Appl. No. 11/052,409", Jan. 7, 2010, p. 12, Published in: US.

Smith, Duane, "Notice of Panel Decision from Pre-Appeal Brief Review", Jan. 27, 2010, p. 3, Published in: US.

O'Dowd, Sean R., "Resposnse to Office Action dated Sep. 28, 2007 re U.S. Appl. No. 11/052,409", Jan. 5, 2008, p. 15, Published in: US.

O'Dowd, Sean R., "Resposnse to Office Action dated Mar. 11, 2009 re U.S. Appl. No. 11/052,409", Jul. 10, 2009, p. 23, Published in: US.

O'Dowd, Sean R., "Response to Final Office Action dated Oct. 7, 2009 re U.S. Appl. No. 11/052,409", Dec. 7, 2009, p. 21, Published in: US.

O'Dowd, Sean R., "Response to Office Action dated Jul. 16, 2008 re U.S. Appl. No. 11/052,409", Dec. 16, 2008, p. 18, Published in: US.

Drake, Ron, "Inventor Supplemental Declaration", Dec. 16, 2009, p. 2, Published in: US.

* cited by examiner

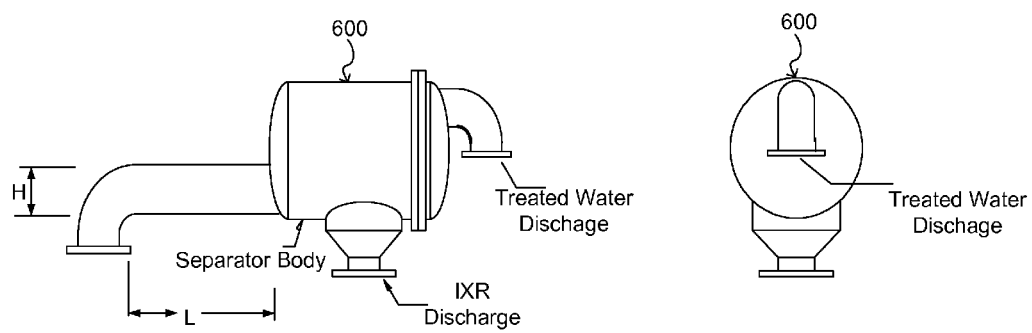 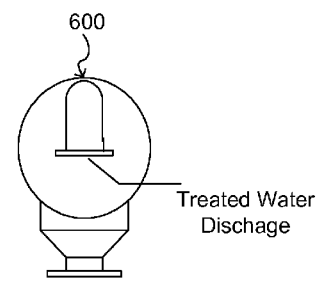
FIG. 6A
FIG. 6B

METHODS FOR HYDRODYNAMIC CONTROL OF A CONTINUOUS WATER PURIFICATION SYSTEM

PRIORITY

This application is a continuation-in-part of U.S. patent application Ser. No. 11/052,409, filed Feb. 7, 2005, entitled APPARATUS FOR REMOVING UNDESIRABLE COMPONENTS FROM A CONTAMINATED SOLUTION CONTAINING BOTH DESIRABLE AND UNDESIRABLE COMPONENTS, now U.S. Pat. No. 7,862,715, which is incorporated herein by reference in its entirety.

FIELD OF THE INVENTION

The present invention relates to liquid purification systems, and more specifically to removal of diverse ions from liquids.

BACKGROUND OF THE INVENTION

Many surface and groundwater resources are classified as sodic or saline-sodic. Sodic water and saline-sodic water both contain high concentrations of monovalent sodium ions in solution relative to lower concentrations of divalent calcium and magnesium ions. Sodic water is defined as water having a sodium adsorption ratio (SAR) value greater than 15 where the SAR value is defined by the following equation:

$$SAR = \frac{[Na+]}{\sqrt{\frac{[CA^{2+}] + [Mg^{2+}]}{2}}} \qquad \text{Eq. 1}$$

Where the concentration terms have units of milliequivalents per liter. Sodic water is found in many arid and semi-arid areas of the world and is also a high volume waste of fossil fuel production. To render sodic water suitable for beneficial use in agriculture, the concentration of the predominant monovalent cations must be reduced without substantially reducing the concentration of the divalent cations in solution. As described in Perry's Chemical Engineers' Handbook, $7^{th}$ ed., chapter 16, page 14, and in Kirk-Othmer's Encyclopedia of Separation Technology, Vol. 2, pages 1074-1076, commercially available ion exchange media are selective and will remove divalent and multivalent cations in preference to monovalent cations. When ion exchange media are employed in conventional fixed or moving bed reactors, divalent cations will be removed to a greater extent than the monovalent cations. Divalent cations, even in low concentrations, will replace monovalent cations on the ion exchange media. Consequently, commercially available produced water treatment schemes that use cation exchange media for sodium removal (e.g., treatment schemes employing Higgins Loop and fixed bed treatment technologies) also quantitatively remove calcium and magnesium. Restoring divalent cations to the solution adds to process complexity and requires conditioning of treated water by chemical addition or mineral contacting plus blending of treated and untreated water streams.

The selectivity of cation exchange media for calcium and magnesium over sodium and potassium has been the major impediment to simple, economical, single contact treatment of sodic water by ion exchange.

SUMMARY OF THE INVENTION

In one embodiment, the invention may be characterized as a method for purifying contaminated liquids. The method in this embodiment includes receiving, via a contaminated solution feed, a contaminated solution, the contaminated solution including an untreated ratio of undesirable ions to desirable ions; mixing the contaminated solution with purifying material; removing the undesirable ions from the contaminated solution by co-currently transporting the purifying material with the contaminated solution so as to produce loaded purifying material and a product solution that includes a treated ratio of undesirable ions to desirable ions, the treated ratio is less than the untreated ratio; separating the loaded purifying material from the product solution; discharging the product solution; counter-currently mixing the loaded purifying material with fresh regenerant so as to produce spent regenerant and purifying material that is regenerated; and transporting the purifying material that has been regenerated in the direction of the contaminated solution feed to enable the receiving, the mixing, the removing, the separating, the discharging, the counter-currently mixing to be continuously repeated.

In another embodiment, the invention may be characterized as a liquid purification apparatus, the apparatus includes mixing means for receiving and mixing a contaminated liquid with a regenerated purifying media, the mixing means defining a mixing process volume; reactor processing means, open to the mixing process volume, the reactor processing means including means for co-currently transporting and reacting a mixture of the regenerated purifying media and the contaminated liquid to produce a decontaminated liquid and a contaminated purifying media, the reactor process means defining a reactor process volume; separating means, open to the reactor process volume, the separating means including means for separating the contaminated purifying media from the decontaminated liquid and means for discharging the decontaminated liquid, the separating means defining a separator process volume; and regenerating means, open to the separator process volume and open to the mixing process volume, the regenerating means including means for counter currently regenerating contaminated purifying media to produce the regenerated purifying media.

In yet another embodiment, the invention may be characterized as a method for selectively removing contaminants from liquid using a continuously circulating stream of purifying media. The method in this embodiment includes mixing a regenerated purifying media, in a predetermined stoichiometric ratio, with a contaminated liquid containing diverse contaminants; co-currently transporting the purifying media and the contaminated liquid in a mixed state for a predetermined time; removing, using the purifying media, while co-currently transporting the purifying media and the contaminated liquid, contaminants from the contaminated liquid so as to produce a mixture of a decontaminated liquid and a contaminated purifying media; separating contaminated purifying media from the decontaminated liquid; contacting the contaminated purifying media in counter current fashion with a regenerant solution so as to produce a regenerated purifying media; and returning the regenerated purifying media to the mixing step, whereby the continuously circulating purifying media selectively removes contaminants from the liquid.

BRIEF DESCRIPTION OF THE DRAWINGS

Various additional objects and advantages and a more complete understanding of the present invention are apparent and more readily appreciated by reference to the following Detailed Description and to the appended claims when taken in conjunction with the accompanying Drawings wherein:

FIGS. 6A and 6B are a perspective view and a side view, respectively, of a variation of the separator depicted in FIG. 5.

DETAILED DESCRIPTION

Figure 1:
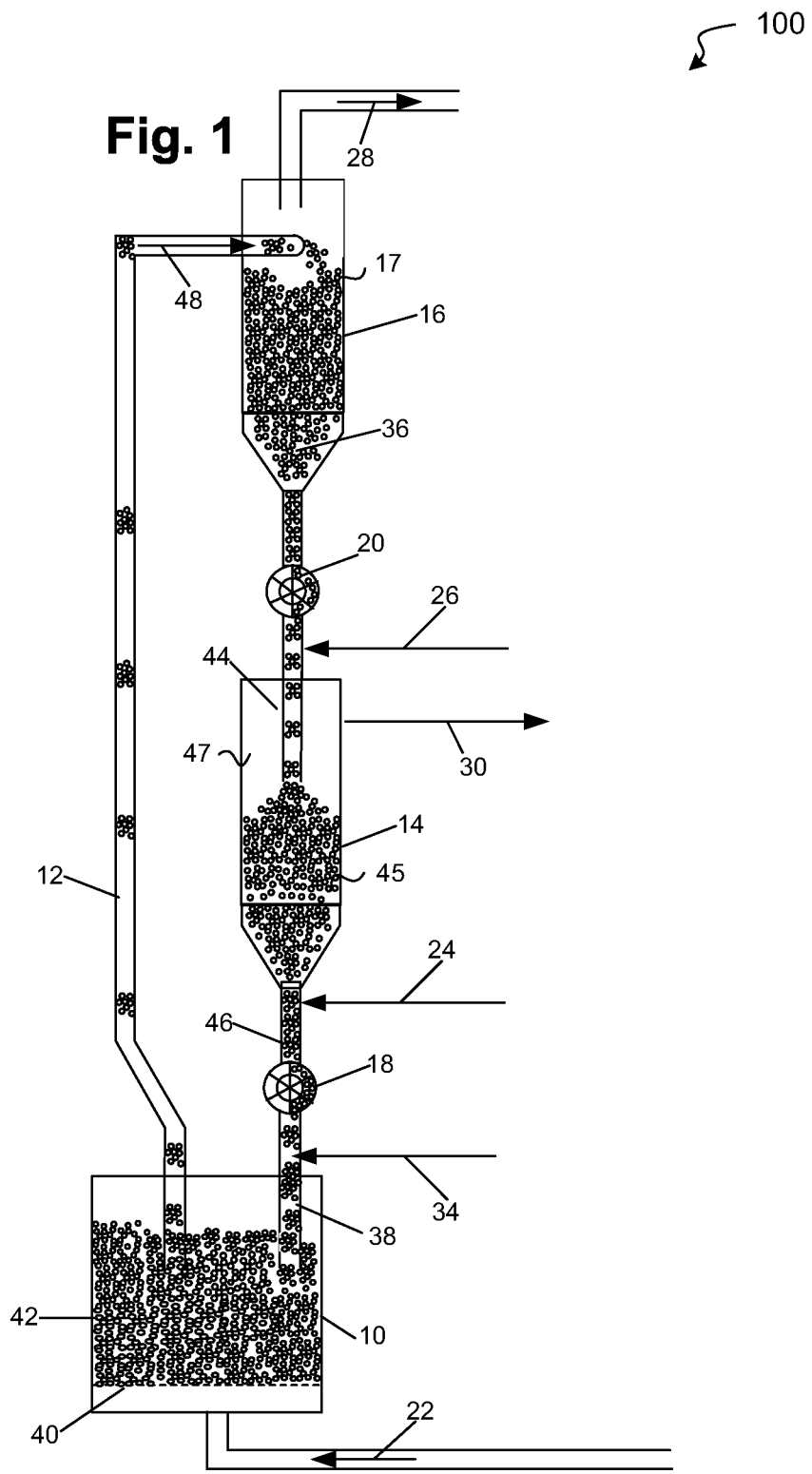
FIG. 1 is a material flow and major equipment arrangement diagram in accordance with one embodiment of the continuous selective ion exchange process.

The invention according to several embodiments may be characterized as a separator for separating purifying material from a purified liquid in a purification system where the purifying material is used to remove undesirable components from a contaminated liquid. The separator in several embodiments provides several advantages to the purification system including gentle separation of the purifying material from purified liquids in a simple and energy efficient manner.

One of ordinary skill in the art, however, will recognize that various embodiments of the present invention may be implemented that add or remove features without departing from the scope of the present invention.

Some background of the kinetic nature of ion exchange purification material in solutions with both desirable and undesirable ions is helpful to an understanding of many embodiments of the present invention. Kinetic studies with ion exchange media dispersed in ion bearing solutions have shown that the rate of removal of cations is proportional to the square root of the product of the cation concentration and the concentration of unused ion exchange media in the reaction volume. The form of the kinetic equation for removal of target ionic species is:

$$r_A = k_A (C_{IX} C_A)^{0.5} \qquad \text{Eq. 2}$$

Where $r_A$ is the removal rate of species "A", $k_A$ is the rate constant and $C_{IX}$ and $C_A$ are the respective concentrations of the unused ion exchange media and target ions in solution. Similar expressions can be written for each ionic species in solution, and the relative removal rate for any two species at a given ion exchange media concentration is:

$$\frac{r_A}{r_B} = \frac{k_A}{k_B} \left( \frac{C_A}{C_B} \right)^{0.5} \qquad \text{Eq. 3}$$

Since the rate constants $k_A$ and $k_B$ depend largely on the reaction conditions and transport properties of the fluid, which are the same for both ionic species, the rate constants are approximately equal. Therefore, the initial relative rate of removal of two ionic species is approximated by the square root of the ratio of their concentrations in solution. For example, if sodium ions are present at nine times the concentration of calcium ions in solution, fresh ion exchange media will remove sodium ions at a rate approximately three times as fast as it will remove the calcium ions.

The hereinabove discussed equations show that the rate of removal of a specific ionic species is a function of the stoichiometric ratio of the concentration of unused ion exchange media capacity and the concentration of the target ions in solution. The most rapid removal of a target ion will occur when fresh ion exchange media is well mixed with solution exhibiting a high concentration of the target ion. As exchange sites on the media are filled and the media approaches full loading, the rate of removal for all species declines and the relative selectivity of the media for specific ionic species controls its equilibrium loading.

Consequently, preferential removal of the more concentrated species can be accomplished by reducing the contact time, increasing the media-to-ion stoichiometric ratio, and controlling the degree of mixing of fresh or partially loaded ion exchange media and the ion bearing solution. The present invention is designed to provide simple and easy control of media-solution contact time, media-solution stoichiometric ratio, and media-solution mixing as needed to take advantage of the aforementioned kinetic phenomena, and thereby allow preferential removal of monovalent ionic species using commercially available ion exchange media that exhibit selectivity for divalent ionic species.

Methods used to acquire kinetic data for ion exchange reactions and to design reactors based on kinetic data are well known to practitioners having ordinary skill in the art.

Although present devices are functional, they are not sufficiently accurate or otherwise satisfactory. For example, many prior art methodologies implement an incremental pulsing to perform batch-like processing (e.g. Higgins Loop Systems). Although these systems are sometimes characterized as carrying out "continuous" ion exchange processing, the incremental pulsing precludes a truly continuous processing. Specifically, Higgins Loop systems use pulse water to move ion exchange media to various locations in a loop where ion exchange processes including resin loading, resin regeneration and resin scrubbing and/or rinsing are performed simultaneously on separate and essentially static beds of ion exchange media. Each time aliquots of ion exchange media are moved to new locations, to undergo the next process step in the Higgins Loop, the various process operations must be interrupted, the positions of valves must be cycled, and pulse water must be introduced and then removed. As a consequence, these types of systems are typically very complex.

In addition, while aliquots of ion exchange media are being transported to the next process step in the Higgins Loop, there is no substantial purification occurring. In order to compensate for these significant periods of time when no purification is taking place, Higgins Loop implementations tend to be very large (e.g., up to forty feet in length). This is because the amount of water that these systems can treat is enhanced by increasing the volume of resin at each processing location in the loop. As a consequence, not only are Higgins Loops very complex, but they are relatively large as well.

Moreover, Higgins Loop systems are relatively energy intensive systems because a substantial amount of energy is needed to move the resin from each stationary processing stage to the next. Specifically, after each processing step, energy must be expended to accelerate a substantial (and practically stationary) mass of resin to the next processing stage.

Yet another disadvantage of the pulse-like processing of the Higgins Loop are the damaging forces imparted to the ion exchange media when pulse water is used to move the ion exchange resin to the next processing stage. Once damaged, the efficacy and useful life of the exchange media are reduced.

Accordingly, various embodiments described herein address one or more of the shortfalls of present technology as well as provide other new and innovative features.

Referring first to FIG. 1 for example, shown is one embodiment of an apparatus in accordance with the present invention that is configured to carry out a continuous selective ion exchange process. As shown, the apparatus 100 includes a fluidized bed reactor 10 equipped with a fluid distributor 40, a media elutriation line 12, a media separator 16 and a media regenerator 14. A primary rotary valve 18 regulates flow rate of regenerated ion exchange media 46 particles from the media regenerator 14 to the fluidized bed reactor 10 through a reactor standpipe 38. A secondary rotary valve 20 regulates flow rate of loaded ion exchange media 36 particles from the media separator 16 to the media regenerator 14. Feed solution 22, fresh regenerant 24, purge solution 26, and fresh ion exchange media 34 are fed to the process at appropriate locations. Likewise, product solution 28 (i.e., the purified liquid) and spent regenerant 30, a byproduct, are discharged from the process at appropriate locations.

Figure 2:
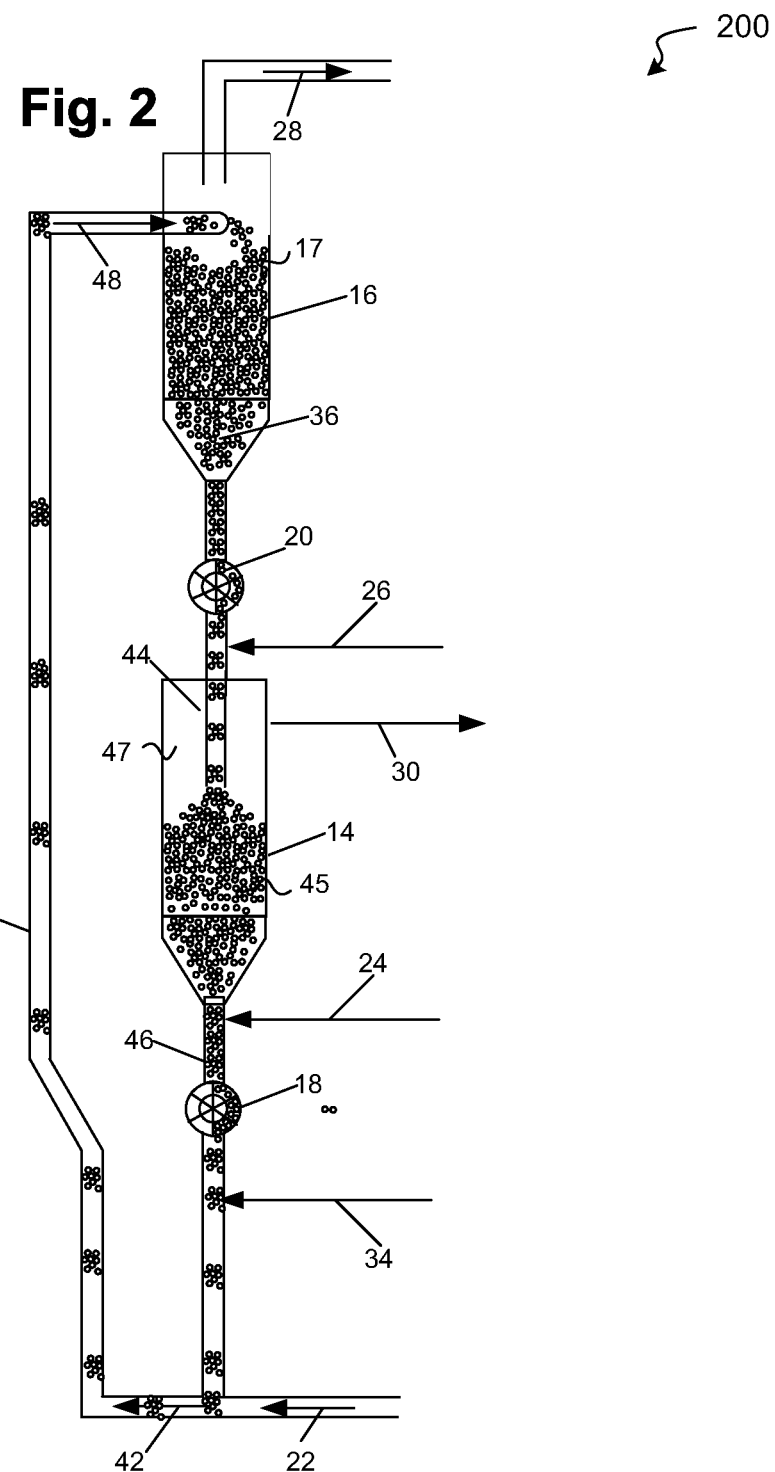
FIG. 2 is a material flow and major equipment arrangement diagram for a simplified embodiment of the continuous selective ion exchange process.

Referring next to FIG. 2, shown is a simplified apparatus in accordance with another embodiment of the present invention, which also carries out a continuous selective ion exchange process and uses a media transport line 32 while omitting the separate ion exchange reactor 10 shown in FIG. 1.

The ion exchange media 34, 36, 46 (generally referred to herein as purifying material) that is utilized may vary from embodiment to embodiment, but good results have been found utilizing 0.65 mm diameter ion exchange beads comprising styrene-divinylbenzene copolymer spheres having sulfonic acid functional groups that serve as cation exchange sites for applications where it is desirable to remove cations from contaminated water. The present invention, however, is certainly not limited to cation removal, and one of ordinary skill in the art will recognize that the purification process of the present invention may be implemented in alternative embodiments utilizing ion exchange media that is selective to anions (e.g., to remove Iodide ions from contaminated water). A typical media for anion exchange would comprise 0.60 mm diameter styrene-divinylbenzene copolymer spheres having quaternary amine functional groups that serve as anion exchange sites.

During operation of the liquid purification process carried out by the embodiments depicted in FIGS. 1 and 2, ion exchange media are continuously circulated through the fluidized bed reactor 10, media elutriation line 12, media separator 16, and media regenerator 14. In these exemplary embodiments of FIGS. 1 and 2, undesirable components (e.g., cations or anions) in the contaminated liquid combine with the ion exchange media 46 so as to generate treated liquid while being transported in the direction of the separator 16. In the embodiments described with reference to FIG. 1, target ions are removed from feed solution in the ion exchange reactor 10 and during transport through the elutriation line 12.

Advantageously, the reaction volume of a fluidized bed reactor 10 can be increased or reduced by simple adjustment of the vertical position of the lower end of the media elutriation line 12. Placing the lower end of the media elutriation line closer to the fluidized bed reactor's 10 fluid distributor 40 reduces the reaction volume and, therefore, reduces the contact time between the ion exchange resin and the feed solution 22. If the desired ion exchange reactions are sufficiently fast, the fluidized bed reactor 10 shown in FIG. 1 may be omitted and, as shown in FIG. 2, the removal of undesirable components from the contaminated liquid via ion exchange reaction will be accomplished in the media transport line 32.

In the embodiment shown in FIG. 1, feed solution (e.g., contaminated water) is brought into contact with the fresh 34 and/or regenerated ion exchange media 46 in the fluidized bed reactor 10 to produce a reactant slurry 42. Ion exchange reactions occur in the fluidized bed reactor 10 and the elutriation line 12 yielding a product slurry 48 that flows through the elutriation line 12 and into the media separator 16. Specifically, within the fluidized bed reactor 10 and the elutriation line 12, the ion exchange media 46 combines with undesirable components in the contaminated liquid so as to generate a purified liquid along with loaded ion exchange media. The loaded ion exchange media and the purified liquid are then separated in the separator 16 so as to provide the purified liquid 28. In other words, the fluidized bed reactor 10 and the media elutriation line 12 in the apparatus 100 of FIG. 1 form a purifying portion that includes a reaction volume within which the purification of contaminated liquid occurs, while the ion exchange material is being transported to the separator 16.

In the embodiment shown in FIG. 2, feed solution 22 is directly mixed with regenerated 46 and/or fresh ion exchange media 34 to form the reactant slurry 42, and ion exchange reactions occur in the media transport line 32 that discharges product slurry 48 into the media separator 16. Specifically, within the transport line 32, the ion exchange media 46 combines with undesirable components in the contaminated liquid so as to generate a purified liquid along with loaded ion exchange media. The loaded ion exchange media and the purified liquid are then separated in the separator 16 so as to provide the purified liquid 28. In other words, the transport line 32 in the apparatus 200 of FIG. 2 forms a purifying portion that includes a reaction volume within which the purification of contaminated liquid occurs—while the ion exchange material is being transported to the separator 16.

Unlike other prior art purification techniques, the apparatus 100, 200 of FIGS. 1 and 2 are adapted so as to be capable of selectively removing undesirable components from contaminated liquid that includes both undesirable and desirable components. For example, in the Coal Bed Methane Industry, locations with contaminated water comprising a high concentration of Sodium, an undesirable component, as well as Magnesium and Calcium (desirable components) are prevalent. Readily available ion exchange media, however, have a higher affinity for the Magnesium and Calcium ions relative to the Sodium ions. As a consequence, at equilibrium, the ion exchange media tends to combine with (so as to remove) the desirable components while leaving the undesirable components.

As discussed above, before an equilibrium state exists, i.e., when fresh or regenerated ion exchange materials are initially exposed to diverse ions (e.g., both desirable and undesirable ions) the ion exchange media tend to combine, at a greater rate, with the ions that exist in the highest concentrations relative to ions at lower concentrations. For example, if Sodium ions exist at a higher concentration than Magnesium or Calcium ions, the fresh or regenerated ion exchange media will initially combine with (so as to remove) the Sodium ions at a greater rate than the Magnesium and Calcium ions. But once the ion exchange media becomes loaded (e.g., with Sodium ions) the ion exchange media begins to combine with and remove the desirable ions for which it has a greater affinity (e.g., the Calcium and Magnesium ions).

In accordance with several embodiments of the present invention, the apparatus 100, 200 of FIGS. 1 and 2 are capable of removing undesirable components while leaving desirable components in the purified water by controlling the time the ion exchange media is exposed to the contaminated water. Specifically, the apparatus 100, 200 are adapted so that the volumetric flow rate of the ion exchange media may be varied by changing the speed of the rotary valve 18. In this way, the volumetric flow rate of the resin is adjustable so as to transport the ion exchange resin through the reaction volume and to the separator 16 before the ion exchange resin removes a substantial amount of the desirable components (e.g., Magnesium and Calcium). In other words, the apparatus 100, 200 of FIGS. 1 and 2 are operable, in some embodiments, so that fresh 34 or regenerated 46 ion exchange media is exposed to the contaminated water to remove the Sodium ions, which exist in high concentration, but before the ion exchange media begins to remove the desirable Magnesium and Calcium ions from the purified water, the ion exchange media is separated from the purified water.

In this way, the desirable components (e.g., Magnesium an Calcium), which provide purified water with a low SAR value, are not removed from the contaminated water. This is in contrast to other prior art systems which remove both desirable (e.g., Calcium) components along with the undesirable (e.g., Sodium) components and then achieve a low SAR value by introducing desirable components (e.g., Calcium) to the purified water (e.g., by adding lime, limestone, or gypsum) so as to achieve a low SAR value. It should be recognized that the apparatus 100, 200 are certainly not limited to purifying contaminated water in this manner. For example, the apparatus 100, 200 are also employable to remove both undesirable components as well as Calcium and Magnesium, which may or may not be "desirable components" in every instance. Moreover, the apparatus 100, 200 are certainly employable to purify contaminated water that includes only undesirable components.

As shown in FIGS. 1 and 2, after the separator 16 recovers the purifying material (e.g., ion exchange media) from the product slurry 48 and discharges clarified product solution 28 (e.g., purified water), the ion exchange media is fed to the regenerator 14. Thus, in the exemplary embodiment, the feed solution 22 (e.g., contaminated water) is treated, in one pass, through the reaction volume. Separation of the loaded purifying material (e.g., the loaded ion exchange media 36) from the treated liquid may be accomplished by various known methods. Some of these known methods of separating loaded purifying material from the purified liquid are gravity settling, straining, and cyclone separation. These methods of separation are simple, have no moving parts, and minimize mechanical breakage and attrition of the media.

Figure 5:
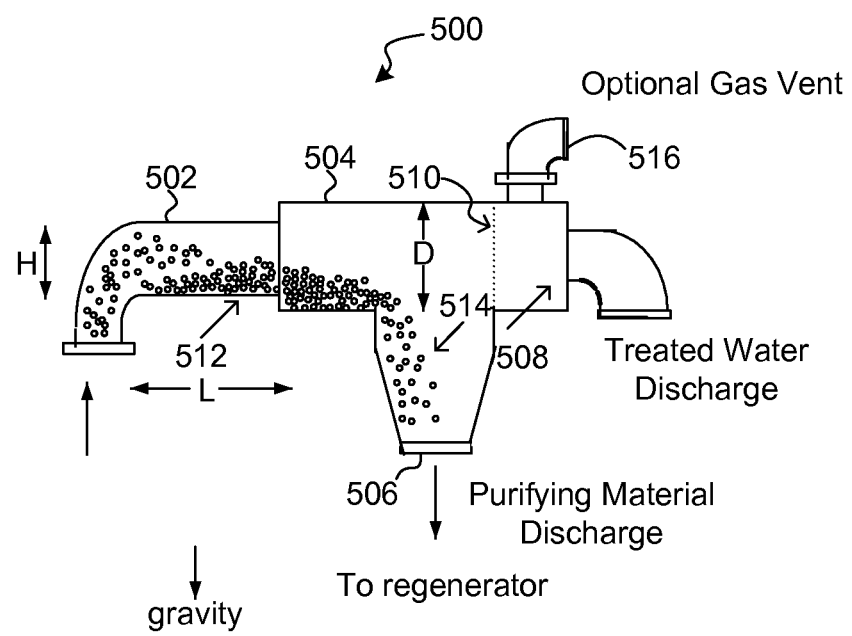
FIG. 5 is a cut-a-way view of another embodiment of the separator depicted in FIGS. 1, 2 and 3.

In addition to these known methods for separating loaded purifying material and the purified liquid, a novel separator is described further herein with reference to FIGS. 5, 6A and 6B.

As shown in FIGS. 1 and 2, the loaded purifying material 36, after being separated from the purified liquid 28, flows to the regenerator 14 by means of gravity transport through the secondary rotary valve 20 and via the regenerator standpipe 44. The media transfer rate through the secondary rotary valve 20 is proportional to the secondary rotary valve 20 rotation speed. As discussed further herein with reference to FIG. 3, the secondary rotary valve may be omitted from other embodiments without adversely affecting the purification process.

Within the regenerator 14, undesirable components are removed from the loaded purifying material 45 so as to allow the purifying material to combine with additional undesirable components in the contaminated liquid 22. In accordance with several embodiments of the present invention, the undesirable components are removed from the loaded purifying material 45 by exposing the loaded purifying material 45 with a regenerant 24, which attracts and combines with the undesirable components, thereby removing the undesirable components from the purifying material. The result of the regeneration is a byproduct comprising a depleted regenerant and the undesirable components. In addition, regenerated purifying material (e.g., regenerated ion exchange media 46) is produced during the regeneration process.

As shown in FIGS. 1 and 2 (and FIG. 3 discussed further herein), counter current contacting of regenerant and loaded purifying material is one effective method for accomplishing the regeneration process. Counter current contacting (i.e., where an upward flowing regenerant stream is exposed to a downward flowing stream of purifying material) produces maximum regeneration of purifying material and a minimum amount of by product while using the minimum amount of regenerant in the smallest regenerator vessel volume.

The particular regenerant 24 utilized may vary from application to application depending upon the undesirable components that are to be removed from the contaminated liquid. In applications where Sodium ions are the undesired components of contaminated water, for example, the regenerant may be sulfuric acid ($H_2SO_4$). In this way, when the sulfuric acid regenerates the purifying material loaded with Sodium (i.e., by combining with the sodium in the loaded purifying material) the generated byproduct is a sodium sulfate brine ($Na_2SO_4$). Although Sodium Sulfate is a byproduct of some embodiments of the present invention, it has marketability by virtue of having several useful applications (e.g., in various consumer products, such as in soaps and detergents, pulp and paper, and textiles). As a consequence, and as opposed to other purification techniques that generate Sodium Chloride (NaCl), which has little value relative to Sodium Sulfate, the Sodium Sulfate byproduct of some embodiments may at least partly, if not completely, offset the associated costs of regenerant.

As another example, in embodiments of the present invention utilizing an anion selective purifying material (e.g., anion exchange resin such as DOWEX Marathon A), which may be used to remove Iodide ions from a contaminated water, a Sodium Hydroxide regenerant may be utilized to regenerate the purifying material, which may be further treated by known chemical processes so as to isolate Iodine ($I_2$) as a byproduct, which is also a marketable byproduct.

Yet another advantage of the apparatus 100, 200 of FIGS. 1 and 2 is the ability to be operated such that the ion exchange media are only partially loaded when removing undesirable components from contaminated water and only partially regenerated within the regenerator. By operating in this manner, less regenerant is utilized and less brine is produced.

Referring again to the embodiments depicted in FIGS. 1 and 2, loaded ion exchange media 45 are continuously regenerated in the regenerator 14 by counter current contact with fresh regenerant 24. Specifically, fresh regenerant 24 is introduced near the bottom of the regenerator 14 and flows upward counter to the descending ion exchange media 45. The regenerator 14 in this embodiment is designed so that the upward superficial velocity of the regenerant 24 is less than the superficial fluidizing velocity of the loaded ion exchange media 45. Spent regenerant 30 (e.g., brine), the byproduct of the purification process, is withdrawn from the fluid filled headspace 47 above the bottom end of the regenerator standpipe 44 and in the upper portion of the regenerator 14. Optionally, a purge solution 26 may be introduced just below the secondary rotary valve 20 to minimize contamination of the product solution 28 by spent regenerant 30 that might otherwise be contained in the pocket flow and leakage through the secondary rotary valve 20.

It should be noted that in the embodiments depicted in FIGS. 1 and 2, the ion exchange resin are automatically rinsed, without additional piping or equipment, via pocket-flow of clean water that moves upward through the primary rotary valve 18 from the reactor standpipe 38. This is a significant advantage over prior art systems (e.g., Higgins Loop systems) that regenerate resin as a static or fixed bed. This prior art technique produces a bed of regenerated resin with acid occupying its pore volume. And the acid in the resin bed's pore volume is typically rinsed from the resin—as part of a separate, dedicated processing step—or else the first aliquot of contaminated water that passes through the bed will displace the acid in the resin bed's pore volume—producing an "acid slug" in the treated water stream.

In contrast, the embodiments depicted in FIGS. 1 and 2 continuously rinse the regenerated ion exchange media 46 with the pocket flow in the lower part of the regenerator 14 and the standpipe 18, which prevents an "acid slug" from forming without a separate rinse step or additional equipment.

As shown in FIGS. 1 and 2, regenerated purifying material (i.e., the ion exchange media 46) are transferred from the regenerator 14 into the fluidized bed reactor 10 by means of gravity transport through a flow controller, which in this embodiment is the primary rotary valve 18, and via the reactor standpipe 38. The ion exchange media transfer rate through the rotary valve 18 is proportional to the primary rotary valve rotation speed.

By the process hereinabove discussed ion exchange media are continuously cycled through the fluidized bed reactor 10, media elutriation line 12, media separator 16, media regenerator 14, and back to the fluidized bed reactor 10.

The inventory of ion exchange media in the process circuit is initially charged or replenished through the fresh ion exchange media 34 line into the reactor standpipe and between the primary rotary valve 18 and the fluidized bed reactor 10. Alternatively, ion exchange media may be charged or replenished directly into the fluidized bed reactor 10.

The primary and secondary rotary valves 18 and 20 are preferably designed or operated such that the rotation speed of the secondary rotary valve 20 exceeds the rotation speed of the primary rotary valve 18 by a predetermined value. With this mode of operation, the primary rotary valve speed is used to easily regulate the overall ion exchange media circulation rate and, thereby, adjust the media-to-solution stoichiometric ratio as needed to remove target exchangeable ions in the feed solution. It should be recognized, however, that in alternative embodiments, the secondary rotary valve 20 is completely removed from the apparatus 100, 200 without affecting the advantages and functionality of the apparatus 100, 200 described herein.

In the simplified embodiment (FIG. 2) of the continuous selective ion exchange process, ion exchange media discharged from the primary rotary valve 18, or introduced via the fresh ion exchange media 34 line, are directly entrained by the feed solution 22. Desired ion exchange reactions occur during transport of the resulting slurry 42 in the media transport line 32. The media transport line 32 may be provided in alternate configurations, (e.g., loops, coils, spirals, etc.) as needed to accomplish slurry transport, to control mixing of media and solution, and to provide optimum contact time for ion exchange. No separate ion exchange reactor is used. In all other respects, operation of the simplified embodiment of the instant process is the same as hereinabove discussed for the embodiment depicted in FIG. 1.

Advantageously, the flow controlling aspects of the rotary valve 18 in the apparatus 100, 200 of FIGS. 1 and 2 allow an amount of purifying material (e.g., regenerated ion exchange media 38) to be varied so as to be capable of modulating the amount of purifying material exposed to the contaminated water, and hence, controlling the amount of undesirable materials removed from the contaminated water. For example, if a contaminated liquid only needs to be partially purified (e.g., to meet a specific governmental regulation), the transfer rate of the purifying material exposed to the contaminated liquid may be reduced below a maximum transfer rate so as to provide the stoichiometric ratio of purifying material to contaminated water necessary to achieve the desired level (e.g., governmentally required level) of purification.

Figure 3:
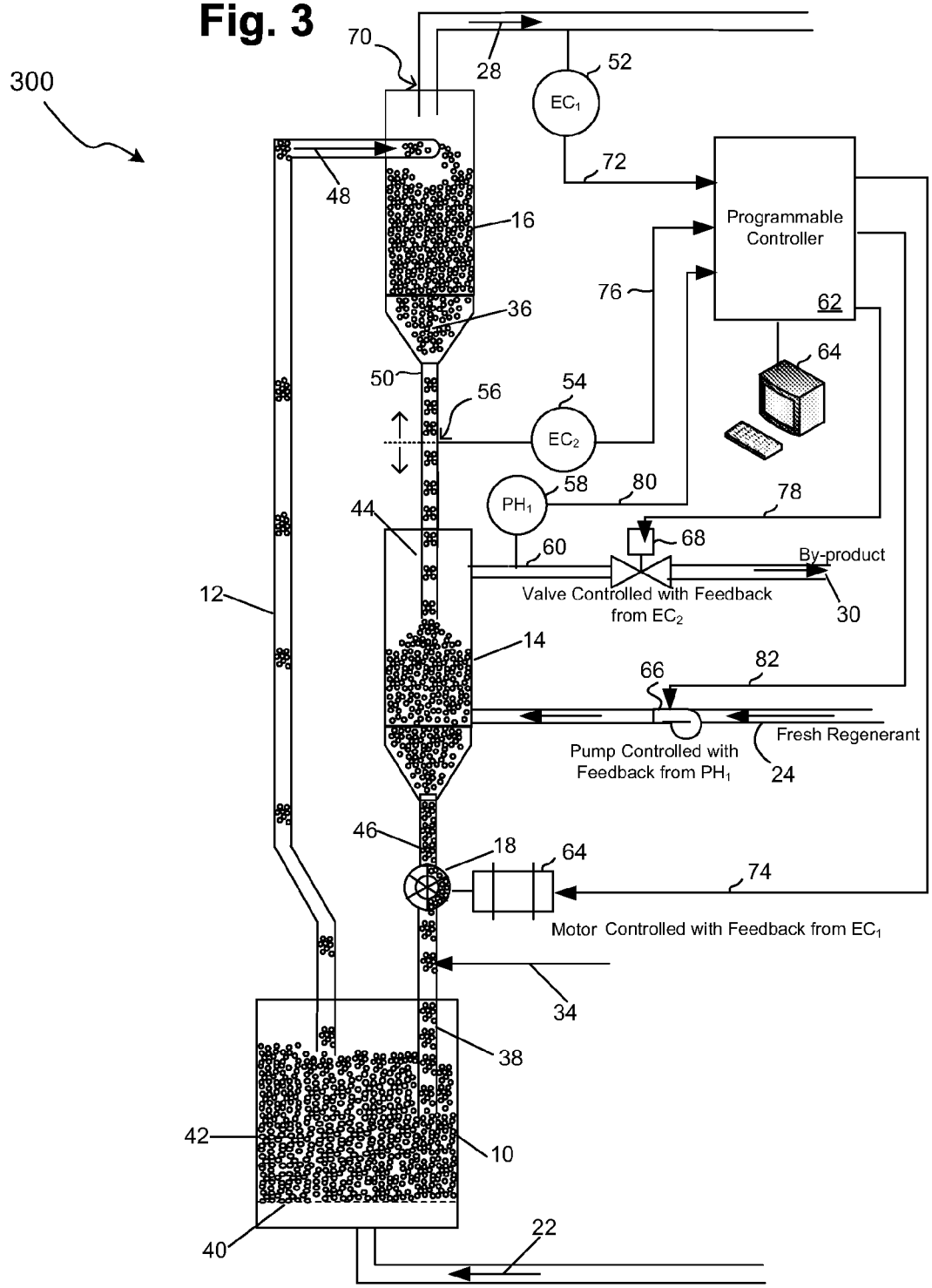
FIG. 3 is a schematic diagram depicting an embodiment of a control system implemented in connection with a variation of the liquid purification systems of FIGS. 1 and 2.

Moreover, as discussed further in reference to FIG. 3, the stoichiometric ratio of purifying material to the contaminated supply liquid may be modulated on an ongoing basis in response to the purification level of the purified product 28 so as to maintain the desired purification level of the purified product 28. It should be recognized, however, that the purification process in accordance with several embodiments of the present invention is certainly not limited to partial purification and may be utilized to generate substantially complete purification (e.g., removal of substantially all undesirable components) from a contaminated liquid.

Thus, the purification apparatus 100, 200 of FIGS. 1 and 2 are capable of controlling the duration that fresh or regenerated ion exchange media is exposed to contaminated liquid, so as to enable selective removal if diverse types of ions, and capable of controlling the stoichiometric ratio of the ion exchange media to the contaminated liquid so as to allow variable degrees (e.g., partial to complete) purification of the contaminated liquid. As a consequence, the invention according to several embodiments, is well adapted to treating water containing only undesirable components, as well as adapted to remove undesirable components from a mix of undesirable and desirable components, while at the same time adapted to vary the degree to which undesirable components are removed from the contaminated water.

Referring next to FIG. 3, shown is another embodiment of a purification apparatus 300, which includes a control system in accordance with the present invention. As shown, in this embodiment, the secondary control valve 20 described with reference to FIGS. 1 and 2 has been removed so that the separator 16 is coupled to the regenerator 14 via a unitary regenerator standpipe 50. Additional changes to the apparatus 300 depicted in FIG. 3, over the apparatus 100, 200 in FIGS. 1 and 2, include a motor 64 coupled to the primary rotary valve 18, a pump 66 positioned to pump fresh regenerant 24 to the regenerator 14, and a byproduct relief valve 68 positioned to control an amount of spent regenerant 30 (i.e., byproduct) removed from the apparatus. Otherwise, the fluidized bed reactor 10, the media elutriation line 12, the regenerator 14 and the primary control valve 18 are coupled together in the same way as the apparatus described with reference to FIG. 1. Moreover, the functionality and advantages of the embodiments described with reference to FIGS. 1 and 2 applies to FIG. 3 as well, but the control system provides additional control over the functionality of the apparatus 100, 200 of FIGS. 1 and 2 as well as additional functionality described further herein.

Also shown in FIG. 3 are components of the control system including an output meter 52, which is positioned so as to meter a purification level of the purified liquid 28 and an interface meter 54 positioned to meter a location of the interface 56 between the byproduct (e.g., brine) generated during the regeneration process and the purified liquid. In addition, a byproduct meter 58 is shown in a position to meter at least one chemical characteristic (e.g., pH) of the byproduct in the byproduct line 60. The output meter 52, interface meter 54 and byproduct meter 58 are shown coupled to a programmable controller 62, which is also coupled to a user interface 64. As shown, the programmable controller 62 is coupled to the motor 64, the pump 66, and the byproduct release valve 68.

While referring to FIG. 3 simultaneous reference will be made to FIG. 4, which is a flowchart depicting steps carried out by the apparatus 300 when controlled by the control system depicted in FIG. 3. Initially, a desired level of purification is identified for the contaminated water (Steps 402, 404). The desired level of purification may be a complete or a partial purification relative to one or more undesirable components in the contaminated water. As discussed, the desired level of purification may be mandated by a governmental regulation, but this is certainly not required.

As shown in FIG. 3, the contaminated water 22 is purified by the removal of undesirable components in the contaminated water 22 with a purifying material (e.g., the ion exchange media 46) so as to generate purified water (Steps 406, 408). While the purification of the contaminated water 22 is taking place in the fluidized bed rector 10 and the elutriation line 12 (collectively referred to as a purification portion), the purifying material, contaminated water and purified water are transported toward the separator 16 (Step 410).

In the present embodiment, by the time the purifying material is received at the separator, the purifying material has combined with undesirable components from the contaminated water so that the water received at the separator is purified to a level of purification (also referred to herein as the actual level of purification), which is dependent upon the time the purifying material was exposed to the contaminated water and the concentration of the purifying material relative to the contaminated water. After being received by the separator 16, the purifying material is separated from the purified water (Step 412), and the purified water is discharged via a discharge port 70 and monitored by the programmable controller 62 via output meter 52 so as to determine the actual level of purification (Step 414).

In one embodiment, the output meter 52 is an electrical conductivity ("EC") meter, which provides an electrical signal 72 to the programmable controller 62 that is indicative of a quantity of undesirable components in the purified water 28. It is contemplated, however, that other metering techniques may be used to determine an actual purification level of the purified water 28.

If the actual purification level of the purified water 28 is not substantially different than the desired level of purification, then the amount of purifying material mixed with the contaminated water 22 is not adjusted (Step 416).

If the actual level of purification is substantially different than the desired level of purification (Step 416), however, then the amount of fresh 34 or regenerated ion exchange media 46 mixed with the contaminated water 22 is adjusted (Step 418). In the exemplary embodiment, the programmable controller 62 varies the amount of regenerated ion exchange media 46 mixed with the contaminated water 22 by sending a drive signal 74, which is a function of a difference between the actual level of purification and the desired level of purification, to the motor 64. The drive signal 74 varies the speed of the motor 64, and hence, the speed of the primary rotary valve 18 so as to vary the volumetric flow rate of the ion exchange media, and as a consequence, the stoichiometric ratio of the ion exchange media to the undesirable components in the contaminated water 22.

As a specific example, if the conductivity of the purified water 22 exceeds a threshold, which indicates, for example, that the actual level of Sodium ions in the purified water 28 exceeds the desired level, the drive signal 74 sent by the programmable controller 62 is set so as to increase the speed of the motor 64. The increased speed of the motor 64, in turn, increases the volumetric flow rate of the ion exchange media 46, which increases the amount of Sodium ions removed from the contaminated water 22 so as to bring the actual number of Sodium ions in the purified water closer to the desired level. In this way, the contaminated water is neither over nor under purified so that the apparatus 300 efficiently generates purified water at the desired purification level.

While the monitoring (Step 414) and the adjusting (Steps 416, 418) are carried out, the loaded ion exchange media travels to the regenerator 14 where the undesirable components (e.g., Sodium) are removed from the loaded ion exchange media with a regenerant 24 and the regenerant combines with the undesirable components so as to generate a byproduct (e.g., $Na_2SO_4$).

As shown in FIG. 3, as the byproduct is generated, it accumulates in the regenerator 14 and rises within the regenerator standpipe 50 so that the interface 56 between the byproduct and the purified liquid is generated within the regenerator standpipe 50. As more and more byproduct is generated, the interface 56 rises in the direction of the separator 16. In the exemplary embodiment, the amount of accumulated byproduct is determined by monitoring whether the interface 56 is above or below a fixed location on the regenerator standpipe 50 (Step 422). Specifically, the interface meter 54 sends a signal 76 to the programmable controller 62, which is indicative of the location of the interface 56, and hence, indicative of the amount of accumulated by-product.

In one embodiment, the interface meter 54 is an electrical conductivity meter, which measures the conductivity of the liquid that happens to be in the regenerator standpipe 50 at the fixed location where the interface meter 54 is positioned. In this way, if the byproduct accumulates so as to push the interface 56 of the byproduct and the purified water above the fixed metering point, the interface meter 54 will measure the conductivity of the byproduct, which in the case of a brine byproduct, will be higher than the conductivity of the purified water. As a consequence, if the interface 56 rises above the location of the interface meter 54, the signal 76 sent to the programmable controller 62 from the interface meter 54 will be indicative of a higher accumulation of the byproduct. Similarly, if the interface 56 falls below the interface meter 54, the signal 76 sent to the programmable controller 62 will be indicative of a lower accumulation of the byproduct. It should be recognized that this technique is just one way of measuring the accumulation of byproduct, and that other techniques are contemplated and well within the scope of the present invention.

Figure 4:
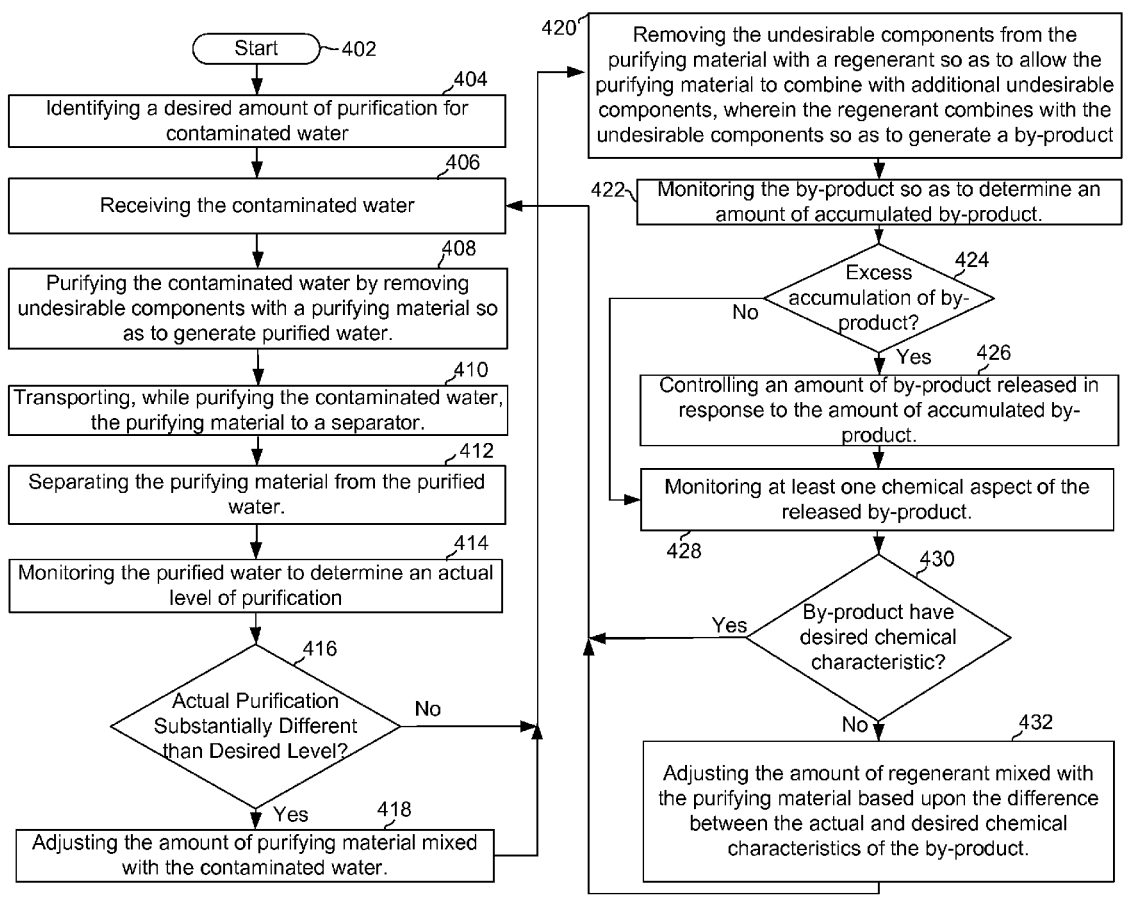
FIG. 4 is a flowchart depicting steps traversed by the control system of FIG. 3 in accordance with an exemplary embodiment of the present invention.

As shown in FIG. 4, if there is an excess accumulation of the byproduct (Step 424), then the amount of byproduct released from the byproduct line 60 is increased to remove the accumulated byproduct (Step 426). As shown in the exemplary embodiment of FIG. 3, the programmable controller 62 sends a byproduct release signal 78 to the byproduct release valve 68 in response to the signal 76 from the interface meter 54 so that if the interface 56 rises above the interface meter 54, the byproduct release valve 68 opens to release additional byproduct from the regenerator 14. If there is not an excess accumulation of byproduct (Step 424), then the state of the byproduct release valve 68 is maintained.

In addition to monitoring the accumulation of byproduct, the byproduct meter 58 monitors at least one chemical aspect of the released byproduct 60 (Step 428), and sends a signal 80 indicative of the monitored chemical aspect(s) to the programmable controller 62. In several embodiments, the monitored chemical aspect(s) of the byproduct are indicative of whether a desired level (e.g., an optimum level) of regenerant is being pumped into the regenerator 14.

In the present embodiment, the programmable controller 62 compares the actual chemical characteristic of the byproduct to the desired chemical characteristic, and if the byproduct does not have a desired chemical characteristic (Step 430), then the programmable controller 62 sends a pump drive signal 82 to the pump 66, which causes the pump to vary the amount of regenerant pumped into the regenerator 14 based upon the difference between the actual chemical characteristic and the desired characteristic (Step 432).

In some embodiments, the byproduct meter 58 is a pH meter, which monitors the pH level of the released byproduct 60. In these embodiments, the pH level of the byproduct indicates whether more or less regenerant is needed in the regenerator 14. For example, if too much regenerant (e.g., sulfuric acid) is being pumped into the regenerator 14 the pH of the released byproduct 60 will be correspondingly reduced, and the programmable controller 62 will slow the pump 64 so as to reduce the amount of regenerant mixed with the ion exchange media. Similarly, if too little regenerant is being pumped into the regenerator 14, the metered pH will be high and the programmable controller 62 will increase the speed of the pump 64 so as to increase the amount of regenerant mixed with the ion exchange media. Beneficially, the amount of regenerant pumped into the regenerator may be optimized so as to provide only the amount of regenerant necessary to regenerate the ion exchange media.

In the exemplary embodiment depicted in FIG. 3, the apparatus 300 continues to receive contaminated water (Step 406) on an ongoing basis while performing the steps discussed above (Steps 408-432) so as to perform substantially continuous and controllable purification of water.

It should be noted that the apparatus 100, 200, 300 are capable of being operated with a relatively low amount of energy relative to prior art batch-like processing techniques. For example, in some embodiments, the only mechanical energy expended by the apparatus 100, 200, 300 is operating the primary rotary valve 18 (and in variations the secondary rotary valve 20). The primary rotary valve 18 in several embodiments, however, expends much less energy than the amount of energy expended by prior systems (e.g., Higgins Loop systems), which use a considerable amount of energy moving a substantially static bed of resin from one processing stage to another where the resin is again stopped, processed as a substantially static bed, and then moved again.

Referring next to FIG. 5, shown is a cut-a-way view of another embodiment of the separator 16 described with reference to FIGS. 1, 2 and 3. The separator 500 in the present embodiment allows the purifying material (e.g., ion exchange beads) to be gently separated from the purified water so the purifying material is not damaged. As shown, the separator 500 includes a receiving section 502 that has a length L and a height H. In the present embodiment, the height H represents the diameter of a tube having a substantially circular cross section, but this is certainly not required, and other cross section geometries (e.g. ellipsoid, square, rectangular, trapezoidal, triangular etc.) may be used for the receiving section 502 when advantageous and/or convenient. Coupled to the receiving section 502 is a separator section 504 that includes a purifying material discharge port 506 and a purified liquid discharge port 508. Also shown is a screen 510 positioned so as to prevent the purifying material from being discharged with the purified water.

In operation, the receiving section 502 receives the purifying material 512 from a discharge of the purification portion (e.g., the elutriation line 12 or a discharge of the media transport line 32). As shown, when the purifying material enters the receiving section 502, discrete components of the purifying material (e.g., ion exchange resin beads) are distributed along substantially the entire height H of the receiving section 502. As the purifying material travels in a horizontal direction toward the separator section 504, however, the purifying material, which is more dense (e.g., 1.2 g/cc) than the purified water, falls in a vertical direction (i.e., in the direction of gravity) so that a higher concentration of the purifying material components accumulate near a bottom of the receiving section 502.

In the present embodiment, the length L of the receiving section 502 is established so that purifying material with a known velocity in the horizontal direction will fall a distance H over the length L. In this way, by the time the discrete components of the purifying material reach the separator section 504, a substantial portion, if not all, of the discrete ion exchange components have settled at a bottom of the receiving section 502. In some embodiments, the ion exchange media is transported to the separator at approximately 1 foot/second, which means the length L of the receiving section 502 comprising a horizontal cylindrical tube may be 5 feet and the height H may be 10 inches when separating water and 0.65-mm diameter spherical particles exhibiting a specific gravity of 1.2 g/cm$^3$. Since a superficial velocity $V_s$ of fluid in the receiving section 502 is equivalent to a volumetric flow rate Q divided by a cross sectional area $A_r$ of the receiving section 502, the Length L required to produce sufficient separation may be reduced by designing the receiving section to exhibit a cross section having a horizontal major dimension W that is greater than the height H.

As shown, the separating section 504 in the present embodiment is generally configured in the shape of a "T," and the purifying material as well as purified water enter the separator section 504 along the horizontally disposed top portion of the separator section 504. After entering the separating section 504, the purifying material continues to move in a horizontal direction along a bottom of the horizontally disposed top portion of the separator section 504 until it reaches and falls into a vertically disposed portion of the separator section 504.

In the present embodiment, a diameter D of the separator section 504 is designed to produce a circular cross section of the separator section 504 that is large enough to achieve a target superficial fluid velocity (and pressure drop) that is low enough to ensure that hydrodynamic forces on the ion exchange particles are small in comparison to gravitational forces on the ion exchange particles. Other cross section geometries (e.g. ellipsoid, square, rectangular, trapezoidal, triangular etc.) for the separator section 504 may be used when advantageous and/or convenient.

The descending purifying material 514 continues to fall in the vertical direction due to gravity until it is discharged via the purifying material discharge port 506, which is coupled to the regenerator standpipe 50 (not shown). In this way, the purifying material gently falls downward and away from the purified water, which is released via the purified liquid discharge port 508.

As shown, in the event any purifying material has not settled out of the purified water before reaching the screen 510, the screen 510 stops the horizontal movement of the purifying material and the purifying material falls to the purifying material discharge port 506. In the present embodiment, the diameter D of the separating section 504 is designed to ensure that the circular cross section of the separating section 504 is sufficiently large so that hydrodynamic forces on purifying material that reaches the screen 510 are small compared to gravitational forces on the purifying material at the screen 510. This design feature ensures that purifying material will slough off the screen and fall into the purifying material discharge port 506 with less chance of being damaged.

In one embodiment, the screen 510 is a 40 mesh stainless steel screen with a 0.010" diameter wire which yields a 0.015" opening and a total open area of about 36%, but other alternative screens will also work.

Also shown in FIG. 5 is an optional gas vent 516, which is positioned at a top portion of the separator section 504 and is configured to release gas (e.g., $CO_2$) that may be generated during the purification process.

Referring next to FIGS. 6A and 6B, shown are a perspective view and a side view, respectively, of a variation of the separator depicted in FIG. 5. The separator depicted in FIGS. 6A and 6B, is representative of various configurations that may be realized while still achieving separation of the purifying material from purified water by translating the purified water and purifying material along a horizontal distance while the purifying material gently settles out of the purified water stream.

Thus, FIGS. 1-6 enable an efficient and effective process to be carried out. The process includes: (a) mixing fresh or regenerated ion exchange media and a feed solution containing iverse ions; (b) reacting the resulting slurry to produce a product slurry comprised of loaded ion exchange media and stripped product solution; (c) separating the loaded ion exchange media from the product slurry; (d) regenerating the loaded ion exchange media by counter current contact with a regenerant; and (e) conducting the process steps continuously and concurrently, whereby a continuous circuit is produced for dosing, loading, separating, and regenerating the ion exchange media, and whereby more concentrated ions are preferentially depleted in the product solution.

To implement preferential removal of more concentrated ions, and to control the overall degree of water purification, steps are carried out to: (a) control the stoichiometric ratio of ion exchange activity to contaminant ions fed to the ion exchange reactor, (b) prevent contamination of treated water by fluids leaking from the regenerator and into the ion exchange reactor or separator, and (c) minimize production of spent regenerant waste.

As previously discussed, in many implementation, these functions may be accomplished by two rotary valves, one located at the top of the regenerator, and one located at the bottom of the regenerator. The rotary valves control the rate at which ion exchange resin (IXR) circulates through the system, and thus they control the stoichiometric ratio of IXR activity to feed water ion concentration. In addition, the rotary valves provide pressure boundaries between the ion exchange reactor and regenerator (lower rotary valve) and between the regenerator and separator (upper rotary valve), and thus limit fluid leakage from the regenerator.

As a further example, rotary valves may be used to control the rate that IXR solids are transferred by gravity from a chamber above (separator or regenerator) the rotary valve to a chamber below (regenerator or ion exchange reactor) the rotary valve. During operation of a rotary valve, a multiplicity of chambers in the valve rotor are sequentially opened to a solids filled vessel above the valve, closed and rotated against the valve body, and then opened to a fluid filled vessel below the rotary valve. At the upper position, solid particulates flow by gravity into the rotor chamber, and displace fluid that entered the chamber when it was previously opened to the fluid filled vessel located below the rotary valve. When the rotor chamber has been rotated approximately 180 degrees it is opened to the fluid filled chamber and the solid particulates fall out of the chamber, under the influence of gravity, and the solids leaving the rotor chamber are displaced by fluid contained in the lower vessel. In this fashion fluid from the discharge (lower) side of the rotary valve is pumped upward, in approximately the same volume as solids are metered downward through the rotary valve.

This operating characteristic of rotary valves can be used (and is used) to good advantage for accomplishing certain (rinsing IXR, "fluffing" IXR, providing regenerant makeup water, etc.) process functions. In addition, when treating water exhibiting low-to-moderate (EC<3 dS/m) ionic strength, the advantages of using rotary valves (pressure boundary, solids metering capability, upset resistance, etc.) far outweigh the potential problems associated with the phenomenon of counter current fluid pumping produced by operation of gravity fed rotary valves.

Treating water exhibiting high ionic strength, or requiring high ion removal efficiency, requires high IXR circulation rates. At high IXR circulation rates, rotary valves may begin to exhibit significant disadvantages including high counter current fluid pumping volume, non-linear flow response, and hindered or choked solids flow. To mitigate these problems rotary valve installations (including feed and discharge piping and fittings) must be greatly increased in size and must be fitted with fluid purges and purge recycle systems. Mitigation measures to render rotary valves capable of serving treatment process needs at high IXR flux rates greatly increase process complexity and cost.

Although rotary valves are satisfactory in many implementations, in alternative embodiments the use of rotary valves may be reduced or avoided entirely.

Figure 7:
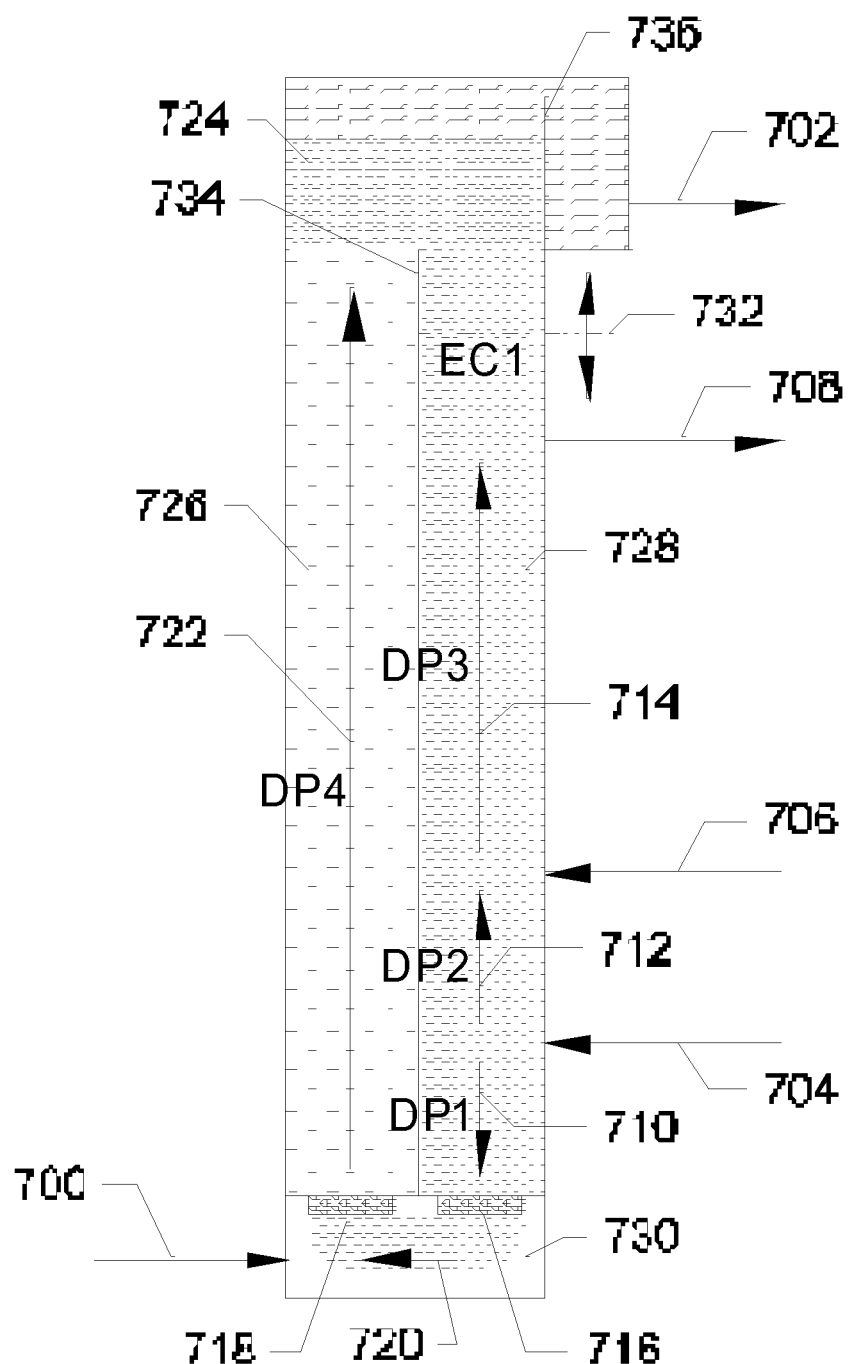
FIG. 7 is a schematic diagram showing the general arrangement of the water purification system, major process volumes, and including direction of major process flows together with key process control measurements.

Referring to FIG. 7 for example, a continuous selective ion exchange process is performed in an apparatus comprised of a fluidized bed reactor 726, and a regenerator 728 connected at the top by a separator plenum 724 and at the bottom by an IXR transfer plenum 730. In this embodiment, the fluidized bed reactor (FBR) 726 and regenerator 728 are located in the same containment vessel, which is divided by a solid chamber separation baffle 734. Both the FBR 726 and the regenerator 728 are open at the top to the separator plenum. The IXR transfer plenum 730 connects the regenerator 728 and FBR 726, at the bottom of the apparatus, by means of an IXR transfer port 716 and a back pressure port 718, respectively. The IXR transfer port 716 and back pressure port 718 both are continuously open during operation of the system.

After exiting the bottom of the regenerator through the IXR transfer port 716, regenerated IXR slurry 720 is mixed with feed solution 700 in the IXR transfer plenum before flowing into the bottom of the FBR 726 through the back pressure port 718. Fluidized IXR 722 fills the FBR 726, removes undesirable ions from the water, and overflows into the separator plenum at the top of the FBR 726. Product solution 702 from which undesirable ions have been removed overflows a separator plenum weir 736 and is discharged on the regenerator side of the separator plenum. The expanded horizontal cross section and fluid flow path, from the FBR 726 toward the top of the separator plenum weir 736, combine to reduce the vertical components of fluid flow in the separator plenum 724 to below values that will support fluidization or vertical transport of IXR particles. As a result, pregnant IXR overflowing the FBR cascades over the chamber separation baffle 734 and falls by gravity into the top of the regenerator 728. IXR falling into the regenerator 728 forms a dense moving bed that transits the regenerator, from top to bottom where it is again discharged into the IXR transfer plenum 730 via the IXR transfer port 716.

While moving vertically downward through the regenerator, IXR is counter-currently contacted with an upwardly flowing stream of mixed regenerant solution 714 that is comprised of a mixture of fresh regenerant solution 706 and IXR rinse solution 712. The mixed regenerant solution 714 strips the undesirable ions from the pregnant IXR and regenerates active ion exchange sites, thus rendering the IXR suitable for further decontamination of feed solution 700, and producing spent regenerant 708 that is withdrawn from the upper region of the regenerator. Continuing downward in the regenerator, regenerated IXR is counter-currently contacted with an upwardly flowing stream of IXR rinse solution 712, in order to minimize "drag-out" of regenerant solution 714 adhering to the IXR, before being transported downward through the IXR transfer port 716 by a stream of transport rinse solution 710. For any given flow rate of total rinse solution 704 fed to the regenerator 728, the fraction of that rinse solution 704 flow that reports to each of the split streams (IXR rinse solution 712 and transport rinse solution 710) is controlled by the flow resistance provided by the system's back pressure port 718.

Some control objectives that several variations of the embodiment in FIG. 7 are capable of meeting include:

a) establishing and maintaining a stable, known, and desired IXR circulation rate;

b) preventing recontamination of product solution by spent regenerant at the top of the regenerator;

c) reducing (e.g., minimizing) "drag out" of regenerant solution adhering to IXR exiting the bottom of the regenerator;

d) reducing (e.g., minimizing) total rinse solution requirement; and e) reducing (e.g., minimize) production of spent regenerant discharged near the top of the regenerator.

The embodiment depicted in FIG. 7 uses hydrodynamic rather than mechanical systems, to continuously control the direction and rate of flow of both particulate solids and fluids between and among three process volumes (reactor, separator, and regenerator) that are continuously open to one another at their respective interfaces, and in combination are used for continuous purification of contaminated water.

There are several advantages to the embodiment depicted in FIG. 7 (and variations thereof) some of which are:

a) A dynamically stable, self-regulating, and controlled circulation of IXR through three process volumes comprised of a reactor, separator and regenerator, when all three process volumes are continuously open to each other at every process volume interface, b) Means to prevent unwanted leakage of fluids from a counter-current regenerator into adjacent process volumes when the adjacent process volumes are continuously open to the regenerator at their respective interfaces with the regenerator, c) The volume of spent regenerant generated by the process is reduced or monimized, d) Continuous control of the direction and flow rate of fluid and solid phases in a counter-current IXR regenerator, e) Continuously controlled dosing of IXR to a contaminated water stream without using rotating equipment or fluid-tight valves, f) Gravity separation and transfer of IXR from a co-current flow reactor to a counter-current flow regenerator with no mechanical device or pressure boundary between the respective process volumes, g) Means to measure the flux of IXR through a co-current fluidized bed reactor, h) Means to measure the magnitude and direction of fluids in a moving dense bed of IXR, i) Means to prevent unwanted dilution or concentration IXR during transfer from a counter-current regenerator and dosing to a co-current fluidized bed reactor, j) Means to minimize "drag out" of regenerant fluids during transfer of IXR from a counter-current regenerator and dosing to a co-current fluidized bed reactor, when the regenerator and reactor are continuously open to one another at the regenerator/reactor interface.

It should be recognized, however, that the embodiment in FIG. 7 is merely exemplary and that it is contemplated that alterations may be made (e.g., to the types and locations of metering and to the control strategies) without departing from the scope of embodiments of the present invention.

As shown, in the in the exemplary embodiment of FIG. 7, instrumentation is provided to measure differential pressures across convenient vertical intervals below the rinse solution 704 feed point DP1 in the regenerator 728, between the rinse solution 704 feed point and the regenerant solution 706 feed point DP2 in the regenerator 728, above the regenerant solution 706 feed point DP3 in the regenerator 728, and in the FBR DP4. In addition, electrical conductance EC1 is measured at a location between the spent regenerant discharge point 708 and the top of the regenerator 728.

During operation, the total hydrodynamic pressure drops (from bottom to top) across the FBR 726 and the regenerator 728 chambers are identical. Both chambers are the same height and are open at the bottom to the IXR transfer plenum 730, which is at higher (water feed) hydrodynamic pressure, and both chambers are open at the top to the separator plenum 724 (water discharge) which is at lower hydrodynamic pressure.

At equivalent superficial fluid flow velocities, the downward flowing dense (void fraction <50%) IXR bed in the regenerator 728 exhibits a specific pressure drop (kPa-s/m2) that is a couple orders of magnitude greater than the specific pressure drop exhibited by the fluidized IXR (void fraction >97%) in the FBR 726. Since the FBR 726, itself, operates at very low (<0.05 m/s) superficial velocities, successful operation of a parallel counter-current regenerator has always required imposition of an artificial pressure boundary (rotary valve, eductor, lock hopper, etc.) at the bottom of the regenerator 728. All such devices, exhibit significant disadvantages including, pulsed or intermittent operation, hindered settling, dilution of process streams, mechanical attrition of IXR, added complexity, poor reliability, plus added capital and maintenance costs. The present invention eliminates these disadvantages by fitting the bottom IXR transfer plenum 730 with simple, inexpensive, IXR transfer 716 and back pressure 718 ports that remain open during process operation and provide continuous, controlled transfer of regenerated IXR from the regenerator 728 and into the FBR 726 and allow controlled operation of the regenerator 728 by hydrodynamic rather than mechanical means.

In several embodiments of the present invention the IXR transfer port 716 and the back pressure port 718 are simple slide-gate type ports with a multiplicity of indexed orifices drilled through a paired slide and stator. The open area is easily adjusted by moving the slide relative to the stator as needed to index the matching hole-patterns from fully opened to fully closed. The ports have no seals, are not fluid tight, and may be fabricated from any convenient and appropriate material. During normal steady-state operation the ports are used as "set-and-forget" items and the open area for either port is not routinely adjusted. Many other devices may be used for the IXR transfer port 716 and back pressure port 718 including simple perforated plates, orifices and modified butterfly and ball valves.

At fixed flow rates for feed solution 700, rinse solution 704, and fresh regenerant solution 706, the flow rates of transport rinse solution 710, IXR rinse solution 712, mixed regenerant solution 714, and IXR slurry 720 can be easily and accurately controlled by reference to a few appropriately placed differential pressure (DP) measurements and adjustment of the hydrodynamic DP across the back pressure port 718.

To prevent contamination of product solution 702 by spent regenerant 708, the regenerator interface 732 between low density product solution 702 and high density spent regenerant 708 is maintained in a narrow region near the top to the regenerator by adjusting the spent regenerant 708 discharge rate so that it exactly matches the mixed regenerant solution 714 flow rate. This control adjustment is easily accomplished by reference to the EC1 measurement of the electrical conductance of interstitial fluid in the upper portion of the regenerator. When the regenerator interface 732 is static, there is virtually no vertical flow of fluid through the IXR in the regenerator 728 above the spent regenerant 708 discharge point. Product solution 702 cannot be contaminated by spent regenerant 708, and spent regenerant 708 cannot be diluted with product solution 702. When this condition exists, increasing the total DP across the regenerator 728 will reduce the transport rinse solution 710 flow rate and will correspondingly increase the IXR rinse solution 712 flow rate and mixed regenerant solution 714 flow rate.

For any fixed aperture of the IXR transfer port 716, increasing the flow rate of the transport rinse solution 710 will increase the flow rate of IXR slurry 720 transferred from the regenerator 728 to the FBR 726. Likewise, increased IXR flux through the FBR 726 increases the total DP across the FBR 726. Since the total DP across the regenerator 728 is equal to the sum of the DPs across the FBR 726 and the backpressure port 718, increased IXR flow will increase the total DP across the regenerator 728 and result in reduced transport rinse solution 710 flow which will cause reduced IXR slurry 720 flow. The opposite is also true; a decrease in IXR flux will decrease the total DP across the regenerator 728, resulting in increased transport rinse solution 710 flow, which will increase IXR slurry 720 flow. In this manner, once set, IXR flow rate in the system is dynamically stable and self correcting in response to induced transients.

Typically, the system is set to produce desired IXR flux with small but measurable transport rinse solution 710 flow (~0.5 cm $H_2O$ on DP1) and significant (~5 cm H2O on DP2) upward IXR rinse solution 712 flow. These settings ensure that most of the fresh rinse solution 704 flows upward in the regenerator 728, but water from the IXR transfer plenum 730 cannot back flow into the regenerator 728 through the open IXR transfer port 716. Mixed regenerant solution 714 flow rate depends on the required concentration and flow rate of fresh regenerant solution 706, but is typically 2 to 5 times (10-25 cm $H_2O$ on DP3) that of the IXR rinse solution 712 flow. At constant superficial fluidizing velocity, fluidized bed differential pressure (DP4) is an approximately linear function of IXR flux through the FBR 726. At startup, with the backpressure port 718 adjusted to provide target transport rinse solution 710 flow rate, the IXR circulation rate is set by adjusting the aperture setting of the IXR transfer port 716 at the bottom of the regenerator 728. Once set, the IXR circulation rate is stable and self-correcting as previously described.

Again FIG. 7 is merely an exemplary embodiment and other variations are certainly possible. For example, the FBR 726 and regenerator 728 can be two separate vessels, having different cross sections, and connected by extended horizontal or inclined conduits serving as the upper separator plenum 724 and lower IXR transfer plenum 730. The separator plenum 724 may be fitted with auxiliary devices (screens, sieves, baffles, cyclones, etc.) to enhance particle separation and trap errant (low density, broken, attached bubbles, etc.) IXR particles. An appropriately sized conduit connecting the bottom of the regenerator 728 to the bottom of the FBR 726 can perform the duel functions of the IXR transfer port 716 and the backpressure port 718. Various vessel internals may be used to enhance contact between solids and fluids in the regenerator 728, and to prevent bulk mixing or occurrence of stagnant regions in the process volume.

Thus, the reader will see that a continuous selective ion exchange process in accordance with one or more aspects of the present invention provides a simple method for controlled, continuous, removal of diverse ions in solution in proportion to their respective concentrations in solution. The process can be used to selectively remove monovalent cations in solution when using commercially available ion exchange media that is selective for divalent cations. This process equipment is simple, easily scaled, and suitable for modular assembly and application. These capabilities and characteristics render the continuous selective ion exchange process particularly suitable for treatment of sodic and saline-sodic waters such as those produced during fossil fuel exploration and development, and as found naturally in many arid regions of the world, although application to other industries is also contemplated.

The foregoing description should not be construed as limiting the scope of the invention, but rather as an exemplification of embodiments thereof. Other variations are possible. For example, orientation of major equipment items in other than a vertical configuration is not required if the rotary valves 18, 20 are replaced by appropriate slurry pumps. A variety of methods, such as centrifugation, cyclone separation, filtration, straining, bypass filtering and settling may be used to accomplish the media separation step. Depending on scale, different regenerator configurations and internals may be used to ensure efficient counter current regeneration of media with regenerant solution. For example, a stirred tank, plug flow tubular reactor or other type of ion exchange reactor may be substituted for the fluidized bed ion exchange reactor. The media transport tube 32 may be furnished in many (banked tubes, loops, coils, spirals, etc.) alternative configurations and lengths. The process may be applied to accomplish either cation or anion removal, or for chemical adjustment of solution ionic composition, ionic strength, or pH. More than one process arrangement may be employed in sequence to achieve concurrent continuous selective exchange of both cations and anions.

Accordingly, the scope of the invention should be determined not by the embodiments illustrated, but by the appended claims and their legal equivalents.

What is claimed is:

1. A method for purifying a contaminated solution liquids, the method comprising:

receiving, via a contaminated solution feed, a contaminated solution, the contaminated solution including a greater concentration of undesired ions than desired ions and an untreated ratio of undesired ions to desired ions;

mixing the contaminated solution with an ion exchange purifying material having a higher affinity for the desired ions than the undesired ions;

removing the undesired ions from the contaminated solution by co-currently transporting the ion exchange purifying material with the contaminated solution so as to produce partially loaded ion exchange purifying material and a product solution that includes a treated ratio of undesired ions to desired ions, wherein the treated ratio is less than the untreated ratio, and wherein the co-currently transporting is limited to a transit time controlled so as to achieve only partial loading of the ion exchange purifying material, whereby loading of the undesired ions onto the ion exchange purifying material is greater than loading of desired ions onto the ion exchange purifying material;

separating the partially loaded ion exchange purifying material from the product solution;

discharging the product solution;

counter-currently mixing the partially loaded ion exchange purifying material with fresh regenerant so as to produce spent regenerant and ion exchange purifying material that is regenerated; and transporting the ion exchange purifying material that has been regenerated in the direction of the contaminated solution feed to enable the receiving, the mixing, the removing, the separating, the discharging, and the counter-currently mixing to be continuously repeated.

2. The method of claim 1, including:
introducing rinse solution with the fresh regenerant and the ion exchange purifying material that is regenerated, wherein the rinse solution that is introduced is split into a rinse solution stream and a transport rinse solution, the rinse solution stream flows in the direction of the fresh regenerant and the transport rinse solution flows in the direction of the purifying material that is regenerated.

3. The method of claim 2, including:
discharging the spent regenerant at a rate that is the same as a flow rate of the fresh regenerant plus the fraction of the rinse solution that flows in the direction of the fresh regenerant.

4. The method of claim 3, including:
controlling a fraction of the rinse solution that reports to the transport rinse solution by controlling a resistance to the transporting of the purifying material.

5. The method of claim 1, wherein the contaminated solution and the ion exchange purifying material are mixed in a predetermined stoichiometric ratio achieved by controlling a circulation rate of the ion exchange purifying media.

6. The method of claim 1, wherein the counter-currently mixing involves gravity moving the partially loaded ion exchange purifying material down while the fresh regenerant is moved against the force of gravity.

7. The method of claim 6, wherein both the contaminated solution and the ion exchange purifying material are transported co-currently against the force of gravity.

8. The method of claim 1, wherein the untreated ratio of undesirable ions to desirable ions is greater than one.

9. A method for selectively removing contaminants from liquid using a continuously circulating stream of purifying media, the method including:
mixing a regenerated ion exchange purifying media, in a predetermined stoichiometric ratio, with a contaminated liquid containing at least desired contaminants and undesired contaminants, a concentration of the undesired contaminants being greater than a concentration of the desired contaminants, the ion exchange purifying media having a higher affinity for the desired contaminants than the undesired contaminants, the contaminated liquid having an untreated ratio of undesired ions to desired ions;

a. co-currently transporting the ion exchange purifying media and the contaminated liquid in a mixed state for a predetermined time;

b. removing, using the ion exchange purifying media, while co-currently transporting the ion exchange purifying media and the contaminated liquid, contaminants from the contaminated liquid so as to produce a mixture of a decontaminated liquid and a partially contaminated ion exchange purifying media, wherein the decontaminated liquid has a treated ratio of undesired contaminants to desired contaminants that is less than the untreated ratio, and wherein the co-currently transporting is limited to a transit time controlled so as to achieve only partial loading of the ion exchange purifying material, whereby loading of the undesired contaminants onto the ion exchange purifying material is greater than loading of desired contaminants onto the ion exchange purifying media;

c. separating the partially contaminated ion exchange purifying media from the decontaminated liquid;

d. contacting the partially contaminated ion exchange purifying media in counter current fashion with a regenerant solution so as to produce a regenerated ion exchange purifying media; and e. returning the regenerated ion exchange purifying media to the mixing step, whereby the continuously circulating ion exchange purifying media selectively removes contaminants from the liquid.

10. The method of claim 9 wherein the predetermined stoichiometric ratio and the predetermined time are selected so as to achieve a desired degree of removal of one or more of the undesired contaminants.

11. The method of claim 9 where the predetermined stoichiometric ratio is achieved by controlling a circulation rate of the ion exchange purifying media.

12. The method of claim 11 wherein the circulation rate of the ion exchange purifying media is controlled by a hydrodynamic means and where the mixing, transport, separation and regeneration steps occur in a mixing process volume, a transport process volume, a separation process volume, and a regeneration process volume that are continuously open to each other.

13. The method of claim 12 wherein the hydrodynamic means of controlling the circulation rate of ion exchange purifying media is measurement and control of a hydrodynamic pressure difference across the transport process volume and the regeneration process volume.

14. The method of claim 13 wherein measurement of the hydrodynamic pressure difference across the transport process volume and regeneration process volume is accomplished by a means for measuring the pressure differential across an interval of the regeneration process volume, and near an exit point of the regenerated ion exchange purifying media from the regeneration process volume.

15. The method of claim 13 where the hydrodynamic pressure difference across the transport process volume and the regenerator process volume is controlled by a means for adjusting the hydrodynamic resistance of the transport process volume to a flow of the liquid and the ion exchange purifying media.

16. A method comprising the steps of:
co-currently mixing a contaminated solution with an ion exchange purifying material to produce a partially treated solution and partially loaded ion exchange purifying material, the ion exchange purifying material having a higher affinity for the desired ions than for the undesired ions, the partially treated solution having a treated ratio of undesired ions to desired ions, wherein the treated ratio is less than an untreated ratio of undesired ions to desired ions, the co-currently mixing limited to a transit time that prevents full loading of the ion exchange purifying material and enables greater loading of undesired ions onto the ion exchange purifying material than loading of desired ions onto the ion exchange purifying material; and
counter-currently mixing the partially loaded ion exchange purifying material with a regenerant solution thereby regenerating the ion exchange purifying material.

17. The method of claim 16, the step of co-currently mixing is carried out in a reactor, and wherein the transit time is controlled by a volume of the purifying material within the reactor at any given time.

18. The method of claim 16, wherein a loading of the ion exchange purifying material during the co-currently mixing is controlled by a flow rate of the ion exchange purifying material.

* * * * *